Figure 1:
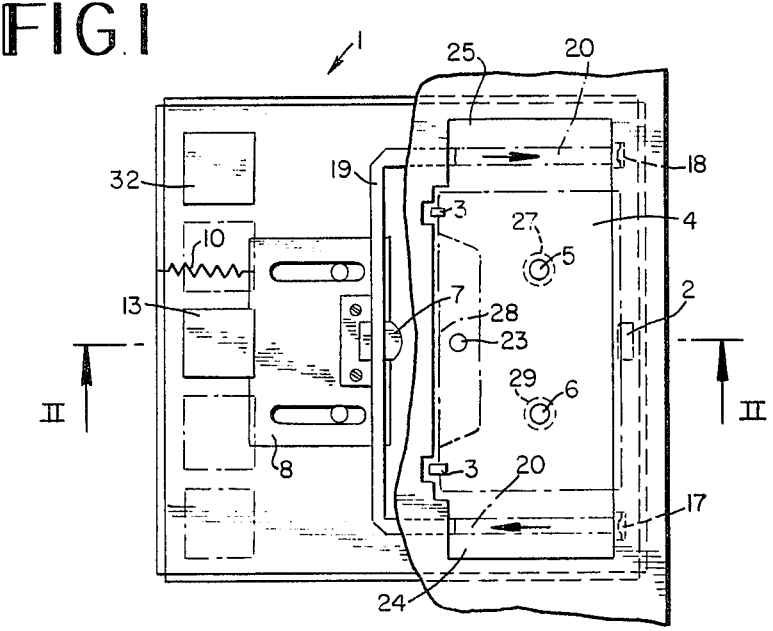

United States Patent

Broghammer

[11] 4,250,527
[45] Feb. 10, 1981

[54] SWITCHING DEVICE FOR CASSETTE TAPE RECORDERS

[75] Inventor: Werner Broghammer, Tennenbronn, Fed. Rep. of Germany

[73] Assignee: Dual Gebrüder Steidinger, St. Georgen, Fed. Rep. of Germany

[21] Appl. No.: 51,308

[22] Filed: Jun. 22, 1979

[30] Foreign Application Priority Data

Mar. 17, 1979 [DE] Fed. Rep. of Germany ....... 2910632

[51] Int. Cl.³ ...................... G11B 21/02; G11B 21/22; G11B 15/18
[52] U.S. Cl. .................................... 360/75; 360/105; 360/96.5
[58] Field of Search ...................... 360/75, 96.5, 96.1, 360/93, 105, 71; 200/DIG. 47; 242/198

[56] References Cited

U.S. PATENT DOCUMENTS

| 3,747,941 | 7/1973 | Van Der Lely | 360/96.5 |
| 4,021,855 | 5/1977 | Czonka et al. | 360/69 |
| 4,024,580 | 5/1977 | Ban et al. | 360/105 |

Primary Examiner—Alfred H. Eddleman
Attorney, Agent, or Firm—Martin A. Farber

[57] ABSTRACT

A switching device for a cassette tape recorder with which the magnetic head, by means of a feed device which is actuatable by a solenoid, is introducable into an opening of the cassette and is again removeable by means of a spring, whereby in the circuit of the solenoid there are disposed in series a first and a second electronic switch and a mechanically controlled first contact pair, and the first electronic switch is controlled by the service control elements for the tape transport (recording/playback or stop), the second electronic switch being controlled by a photoelectric device which is disposed in the region of grabbing of the fingers upon insertion or removal of the cassette and interrupts the circuit of the solenoid as long as the light beam is interrupted by the fingers and the first contact pair is controlled by a sensing pin which projects into the reception area of the cassette and interrupts the circuit of the solenoid as long as no cassette is located in the device, so that the magnetic head automatically is brought into its position of being pulled back from the cassette when the grabbing by the hand takes place and the magnetic head remains in this position when no cassette is located in the operative position, so that the magnetic head never can come into contact with the cassette housing.

4 Claims, 2 Drawing Figures

U.S. Patent  Feb. 10, 1981  4,250,527

SWITCHING DEVICE FOR CASSETTE TAPE RECORDERS

The invention relates to a switching device for a cassette tape recorder in general.

More particularly, the present invention relates to a cassette tape recorder for use with a cassette which has at least one opening on its wide side, through which opening, upon the insertion of the cassette into the device, there can be inserted at least one winding mandrel for engagement in the core of the tape spool, the cassette having at least one opening in one of its narrow sides, in which last-mentioned opening, after the setting of the cassette on the winding mandrel by means of a feed device—which feed device is controlled by a solenoid and which feed device can be transferred against the action of a return spring into the operating position by means of a first control element "tape forward for recording or reproduction", with which first control element the circuit of the solenoid is closeable and which feed device is again releaseable out of this operating position by means of a second control element which likewise controls the circuit of the solenoid—the magnetic head is insertable in a direction perpendicular to the axis of the winding mandrel for the purpose of recording or playback, and which contains means which prevent a mechanical stressing of the magnetic head if with an inserted magnetic head, attempt is made to take the cassette from the device.

If with a device of the previously mentioned type, attempt is made to take a cassette from the device when the magnetic head is inserted into the cassette, the danger exists that the magnetic head goes out of adjustment by mechanical stress. If the device is switched off this danger as a rule does not exist since with the switching off operation customarily the feed device for the magnetic head is also released so that the magnetic head is pulled back away from the cassette.

In the operating position "pause" the tape likewise stops as it does with recorders which are switched "off" or switched to "stop", respectively, however the head is nevertheless located in the cassette. If in this position, for example, from lack of knowledge about the position of the head, attempt is made to remove the cassette from the device, then the danger exists of an unwanted stressing of the magnetic head. The same danger also naturally exists if during playback attempt is made to remove the cassette.

Consequently it has proven advantageous to provide special cassette locking means which are effective with the insertion of the magnetic head into the cassette so these receive and accept the forces with an attempt at removal. The disadvantage of such an arrangement is that they limit the grabbing of, or access to, the cassette, or only allow it if previously an additional control operation is performed, for example, actuation of the stop button.

According to my U.S. Pat. Application Ser. No. 875,558, filed Feb. 6, 1978, now allowed, U.S. Pat. No. 4,177,490, and co-pending (disclosure of which is hereby incorporated by reference as well as that of the patent to be issued thereon) this disadvantage is avoided in the manner that in the range of the gripping movement of the fingers for the removal of a cassette, buttons are mounted which release or start the pulling back of the magnetic head from the cassette and without the actuation of which buttons the cassette cannot be grabbed. Consequently indeed a simplification of the operation is achieved so far as it concerns the manipulation to be made consciously or deliberately; however the device presumes a certain understanding of its function.

It is an object of the invention to effect the protection of the magnetic head against mechanical stresses or strains during insertion or removal of the cassette without any conscious or deliberate manipulation or operation whatsoever having to be carried out. The invention further has the purpose of being able to exchange one cassette during playback for another without having to perform any type of actuation of the control elements and thereby to be able to continue the playback.

In accordance with the invention there is provided a switching device for a cassette tape recorder with which the magnetic head, by means of a feed device which is actuatable by a solenoid, is introducable into an opening of the cassette and is again removeable by means of a spring, whereby in the circuit of the solenoid there are disposed in series a first and a second electronic switch and a mechanically controlled first contact pair, and the first electronic switch is controlled by the service control elements for the tape transport (recording/playback or stop), the second electronic switch being controlled by a photoelectric device which is disposed in the region of grabbing of the fingers upon insertion or removal of the cassette and interrupts the circuit of the solenoid as long as the light beam is interrupted by the fingers and the first contact pair is controlled by a sensing pin which projects into the reception area of the cassette and interrupts the circuit of the solenoid as long as no cassette is located in the device, so that the magnetic head automatically is brought into its position of being pulled back from the cassette when the grabbing by the hand takes place and the magnetic head remains in this position when no cassette is located in the operative position, so that the magnetic head never can come into contact with the cassette housing.

Figure 2:
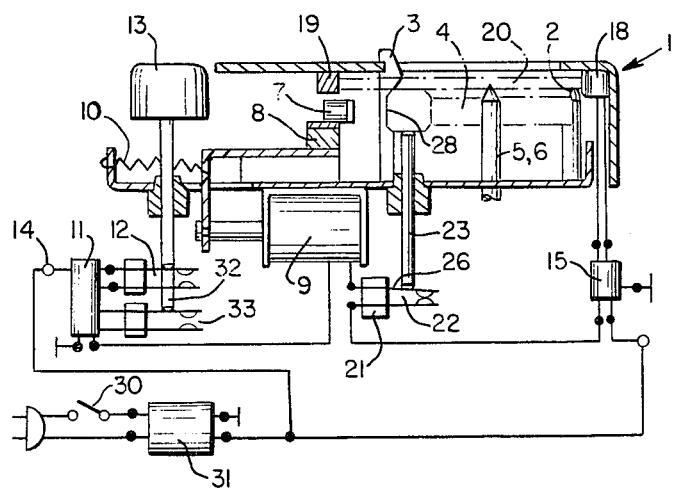

With the above and other objects and advantages in view, the present invention will become more clearly understood in connection with the detailed description of a preferred embodiment, when considered with the accompanying drawing, of which:

FIG. 1 schematically illustrates a front view of the switching device in accordance with the present invention, partly broken away;

FIG. 2 is a side view taken along the section line II—II in FIG. 1.

Referring now to the drawing a cassette 4 is arranged lowered in a cassette unit 1. The cassette is held in the tape unit 1 by a device 2, 3. Upon the insertion of the cassette 4 into the tape cassette device 1 the winding mandrels 5, 6 enter the cassette 4 through openings 27, 29 of the cassette. A magnetic head 7 is fastened on a feed device 8, which feed device is transferable into its operating position against the action of a return spring 10 by means of a solenoid 9. In the operating position the magnetic head 7 enters into an opening 28 of the cassette 4. An opening is formed in a front plate of the device. The front plate is formed with a recess adapted to receive the cassette therein when it is inserted through the opening, the latter communicating with the recess. The solenoid 9 is connectable to a low voltage DC voltage via a current supply part 31, which current supply part is connected with the supply or power mains or power line.

Extensions or enlargements 24, 25 of the recess are provided in the device 1 on both sides of the cassette 4, which extensions provide a space for the fingers of a person to extend adjacent the sides of the cassette when it is being inserted or removed from the recess, the extensions making possible a grabbing of the cassette 4.

A light source 17 is arranged at one end of the first extension 24, which light source projects a light beam 20 along the first extension 24 onto an optical light guide or conductor 19 (e.g., light wire bundle of optical light transmitting fibers), which light conductor 19 is disposed at the other end of this first extension 24. The light conductor 19 is U-shaped and directs and conducts the light beam 20 to one end of the other, second extension 25, from where it is projected along this second extension 25 onto a photo-sensitive element 18.

In the circuit of the solenoid 9 connected in series are a first electronic switch 11, which switch is selectively actuatable by means of a first control or service element 13, which control element serves for setting the normal tape forward running mode ("recording or playback") or by means of a second control or service element 32 ("stop"), a second electronic switch 15 which is controllable by the photosensitive element 18, and further a third switch 21 with a first contact pair 22 which contact pair is connected with a sensing member 23, the latter being actuated by the cassette 4.

If an inserted cassette 4 is to be played, in the usual manner at first the power line switch 30 is closed, whereby via the current supply part 31 (power supply unit) the first electronic switch 11 receives current at its control connection 14. The first contact pair 22 is closed, since with the insertion of the cassette the sensing member 23 was pressed against this first contact pair 22. The second electronic switch 15 is also closed, since the arrangement of the photoelectronic means 17, 18, 19 (which means controls the switch 15) is met in such a manner that the electronic switch closes upon an unhindered light flow of the light beam 20. In order to start the device 1, the control element 13 is pressed momentarily or briefly (transiently), whereby the electronic switch 11 is bridged across or by-passed at a second contact pair 12 and consequently is switched stably or steadily into conduction so that the solenoid 9 receives current and brings the magnetic head 7 into its operating position. Moreover, consequently, in a per se known manner (not illustrated), simultaneously the tape is placed into a forward running mode, and the electrical playback means is switched on. The setting of the first control element 13 can be cancelled or negated under the circumstances if desired in the manner that by means of actuating the second control element 32, the electronic switch 11 is again stably opened via the third contact pair 33.

If the cassette 4 now is intended to be removed from the device 1, then as a consequence of grabbing the cassette the light beam 20 is interrupted, by means of which the electronic switch 15 opens and interrupts the circuit of the solenoid 9, whereby the feed device 8 under the action of the spring 10 pulls back the magnetic head 7 from the cassette 4, so that the cassette can be removed without danger.

Since after removal of the cassette 4, the second electronic switch 15 (which switch 15 is controlled by the photosensitive element 18) has closed itself again, the magnetic head 7 would in itself again go into its operating position and then during the renewed insertion of a cassette 4 the magnetic head would also go again timely into its protective pulled back position. By itself, the protection of the magnetic head 7 consequently would be guaranteed, since the interruption of the light beam 20 during the reinsertion of the cassette 4 has the effect of pulling the magnetic head 7 back before the cassette 4 can be forcibly pressed against it.

However in order to prevent the magnetic head 7 from going out of adjustment, also when an extra manipulational operation of the cassette 4 is made, that is, when avoiding or bypassing the light beam 20, the first contact pair 22 is provided. This first contact pair 22 is controlled by the sensing member 23. The contact pair 22 prevents the closing of the circuit for the solenoid 9 until a cassette 4 is actually in its operating position.

The automatic control of the movements of the magnetic head 7 moreover makes possible an immediate exchange of the cassette 4 without requiring actuation of any control elements, since only the circuit of the solenoid 9 is controlled, which does not result in switching the device off from the supply lines, or respectively, rendering the switched on operating conditions inoperative, as that is the case with "stop-setting".

While I have disclosed one embodiment of the invention, it is to be understood that this embodiment is given by example only and not in a limiting sense.

I claim:

1. Cassette magnetic tape device for use with a tape cassette, which on its wide side has at least one opening, through which a winding mandrel is insertable for engagement in the core of the spool of the tape and which in its narrow sides has at least one opening in which a magnetic head can be inserted, comprising a winding mandrel means for operative engagement in the cassette, a magnetic head, feed means for being displaceably mounted in a plane perpendicular to the axis of said winding mandrel means for transferring said magnetic head into an operative position such that said magnetic head enters into the opening in a narrow side of the cassette, said magnetic head being secured on said feed means, first spring means for biasing said feed means in a direction against displacement thereof into said operative position, a solenoid circuit including a low voltage solenoid means being operatively connected with said feed means for said magnetic head for transferring said feed means against said spring means into the operative position.

a current supply means being operatively connected on the one hand with a power supply line and on the other hand being connected with said solenoid means for supplying said solenoid means with low voltage, a power supply line connection line being connected to said current supply means and adapted to be connected to the power supply line, a power supply switch disposed in said power supply line connection line for said current supply means, a first contact pair of means disposed in said solenoid circuit for opening and closing said solenoid circuit, respectively, a sensing means being operatively connected with said first contact pair of means and for being controllable by the cassette such that said sensing means holds said first contact pair means closed as long as a cassette is located in the device, a first electronic switch disposed in said solenoid circuit in series with said first contact pair means, a second contact pair means connected with said first electronic switch, and said second contact pair means for stably closing said first electronic switch when said second contact pair means is briefly (transiently) closed, a first control means for setting the normal forward movement of the tape (recording or playback) being operatively connected with said second contact pair means such that said first control means closes said second contact pair means as long as said first control means is actuated, a third contact pair means being connected with said first electronic switch, said third contact pair means for stably opening said first electronic switch when said third contact pair means is briefly closed, a second control means for stopping the forward motion of the tape ("stop") being operatively connected with said third contact pair means such that said second control means closes said third contact pair means as long as said second control means is actuated, a second electronic switch disposed in said solenoid circuit in series with said first contact pair means and said first electronic switch, a light source emitting a light beam, a photosensitive element being disposed in the path of said light beam of said light source, said source being disposed in the device such that said light beam is directed on said photosensitive element in a path where said light beam crosses through a space in which at least one of the fingers of a person must engage when the cassette is inserted in and removed from the device, respectively, such that said light beam is interrupted when the cassette is inserted and removed, repectively, said second electronic switch being connected with said photosensitive element such that said second electronic switch interrupts said solenoid circuit for the duration of the interruption of said light beam.

2. The cassette magnetic tape device as set forth in claim 1, the device further comprising a front plate, said front plate being formed with a recess adapted for reception of the cassette therein, said recess on both sides of the cassette includes a first and a second extension extending beyond the sides of a cassette inserted in said recess, said extensions forming a free space for the fingers respectively during manipulation of the cassette in and out of the recess, a light conductor is arranged in the device with respectively each one of its ends being disposed in one of said extensions, respectively, said light source being arranged in said first extension facing opposite one end of said light conductor and emitting the light beam substantially parallel to a side surface of said cassette when the latter is inserted in said recess, said side surface adjoining said first extension and said light beam is aligned with said one end of said light conductor, said photosensitive element is arranged in said second extension opposite to the other end of said light conductor, so that the light beam is emitted therefrom, is substantially parallel to the other side surface of said cassette and light falls on said photosensitive element, said other side surface of the cassette adjoining said second extension.

3. The device as set forth in claim 2, wherein said light conductor is U-shaped.

4. The device as set forth in claim 1, wherein said light source directs the light beam such that said beam has two portions in the range of two fingers of a person grabbing the cassette during insertion and removal, respectively.

* * * * *